United States Patent Office 3,529,281
Patented Sept. 15, 1970

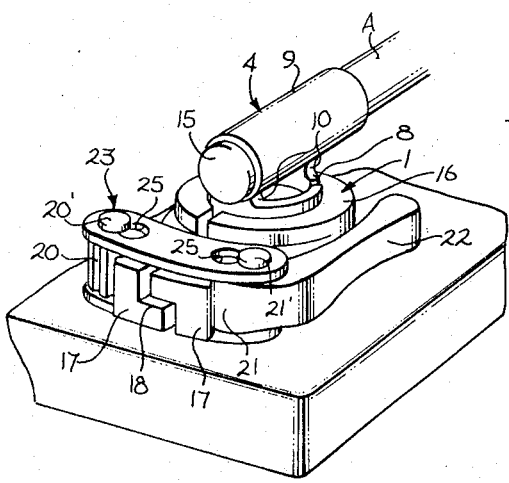

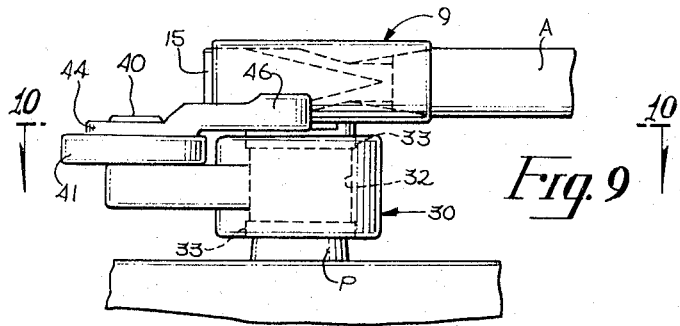
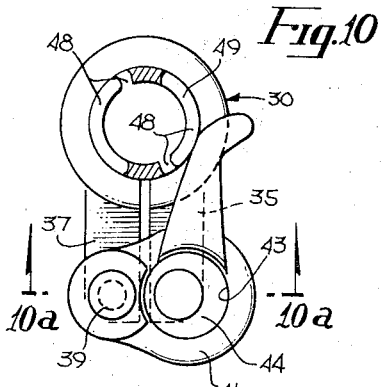
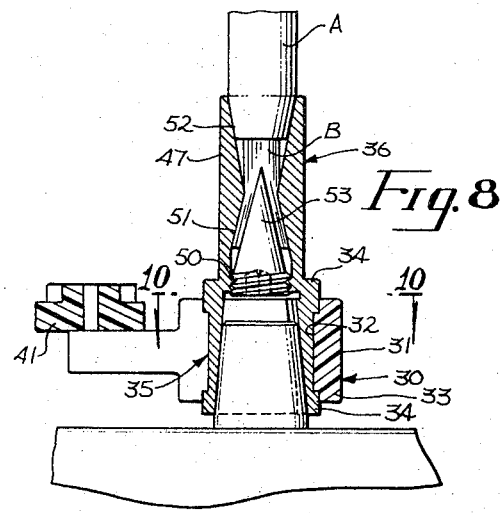
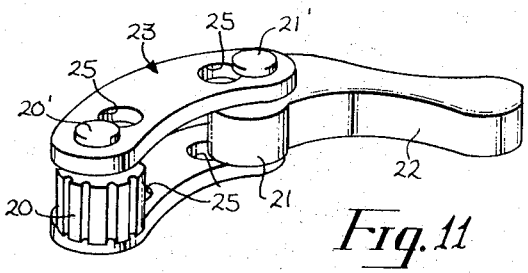
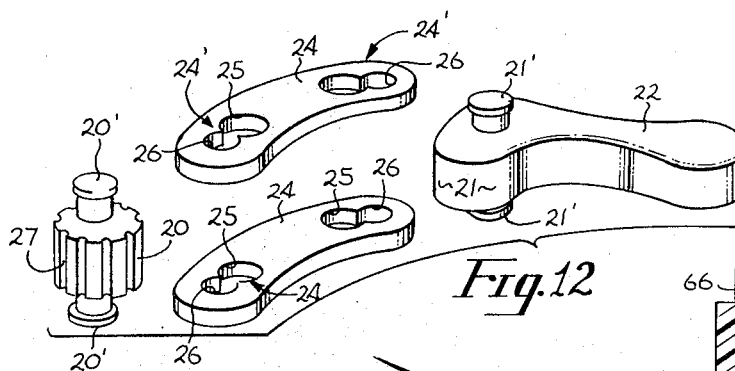
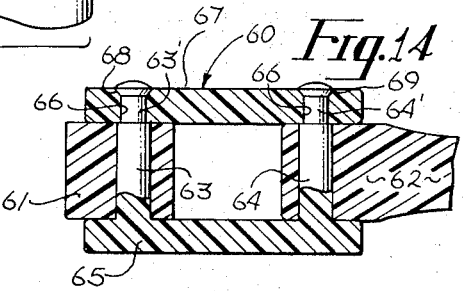
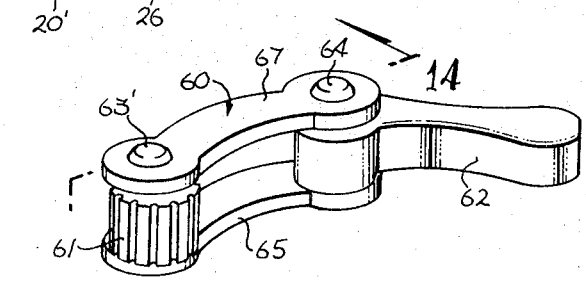

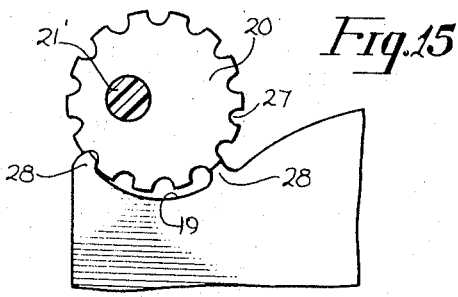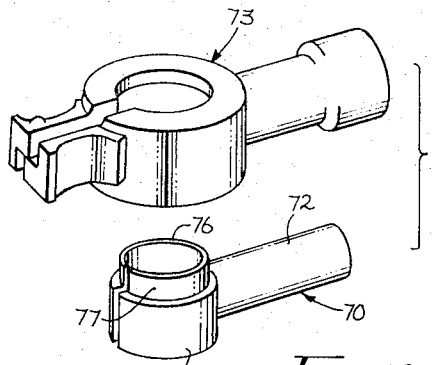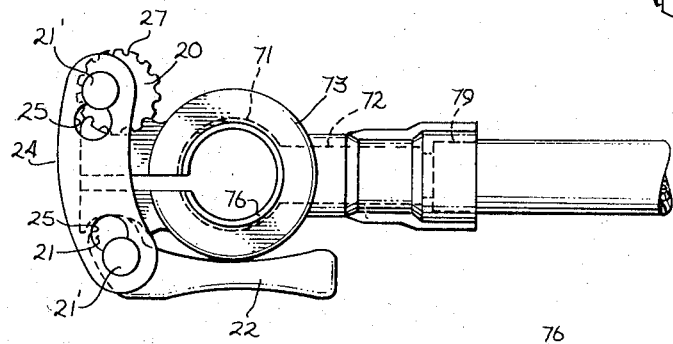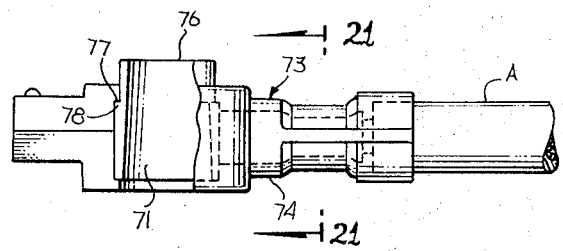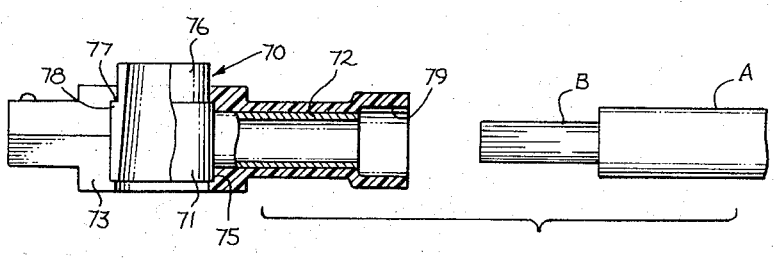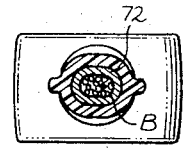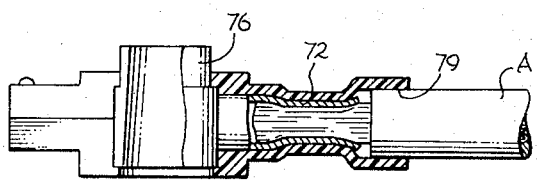

3,529,281
BATTERY CABLE CONNECTOR
David M. Martinez, Sylmar, and Wilfred F. Martinez, Van Nuys, Calif., assignors of one-third to Estelle P. Murphy, Van Nuys, Calif.
Filed June 19, 1968, Ser. No. 738,190
Int. Cl. H01r 7/06
U.S. Cl. 339—239    8 Claims

ABSTRACT OF THE DISCLOSURE

A quick detachable connector for electrical conductors suitable for such uses as connecting cables to storage battery terminals and comparable electrical connections and, in some embodiments, employing an operating means of the general type disclosed in a hereinafter identified copending application of one of the present applicants, the invention being directed to increased resistance to corrosion, by increased range of constriction incident to attachment to a terminal, by unlimited capacity for attachment in a desired position circularly of the axial line of the terminal post to which it is to be connected, by improved solderless means for attaching the connector to the conductor end and in some embodiments, by improved design eliminating the in situ molding of a metal contact component within a nonconductive body component.

BACKGROUND OF THE INVENTION

Field of the invention

The field of the invention is that of electrical connectors of the type generally classifiable in Class 329, Subclasses 238 and 239.

Prior art

The principal prior art comprises the co-pending applications of David M. Martinez, one of the present joint applicants, viz., Ser. No. 641,018, filed May 24, 1967 and Ser. No. 720,762 filed Apr. 12, 1968.

SUMMARY OF THE INVENTION

The presence of corrosion at the terminal connections of storage batteries or like locations, whether used in motor vehicles or elsewhere, has always been a major problem. Screw operated clamping means have involved a metal dissimilar to at least the battery post and, accordingly contributed to the corrosion problem by "freezing" of the nut and screw components. Many cam and lever types of clamping means have been proposed but until the advent of the inventions disclosed in the above-identified applications, those were limited to the range of action of the cam lever component and did not employ non-corrodible materials and hence were limited with respect to the diameter of the battery post with which they were used and did nothing to solve the problem of corrosion.

The present invention affords still another advance in that art by several improvements. Among these improvements are: an improved manually operable means for attaching the connector to the conductor cable or alternatively, an attaching means involving the swaging of a plastic component, both of said attaching means eliminating the soldering operation heretofore believed to be necessary; a new design of clamping means formed wholly of plastic or noncorrodible material; a new design of the meeting faces of the connector which are moved toward each other by the clamping means with resultant increased capacity for such movement; a capacity for complete circular adjustment relative to the axial line of the battery post; a clamping means which is also capable of positive loosening of the terminal engaged contact element of the connector; and a mode of assembly permitting the use of a lead component to engage the battery post with consequent reduction of corrosion. Other objects and advantages will appear as the description of the disclosed presently preferred embodiments of the invention proceeds.

BRIEF DESCRIPTION OF THE DRAWINGS

In the drawings which illustrate the presently preferred embodiment of the invention described in detail in the specification following:

FIGS. 1 and 2 are, respectively, perspective views of first, and second preferred embodiments of the invention as installed on battery terminals, each having a different form of clamping means which, however, are interchangeable between the two embodiments;

FIG. 3 is a perspective view of a third embodiment of the invention involving a cam action clamping means positively included with the nonconductive body but in which embodiment the contact element of the first embodiment is optionally interchangeable.

FIGS. 4 and 5 are, respectively top plan and distal end elevational views of the first embodiment of the invention;

FIG. 6 is a medical sectional view taken on the line 6—6 of FIG. 4;

FIG. 7 is a top plan sectional view taken in the plane of the line 7—7 in FIG. 6;

FIG. 8 is a medical sectional view taken in the vertical plane of the line 8—8 of FIG. 3;

FIG. 9 is a side elevational view of a terminal assembly comprising the contact meeans of the first embodiment of the invention combined with the body member and clamping means shown in FIGS. 3 and 8;

FIG. 10 is a top plan sectional view taken on the line 10—10 of FIGS. 8 and 9;

FIG. 10A is a sectional view taken on the lines 10A—10A in FIG. 10;

FIG. 11 is a perspective view of a form of clamp assembly shown in FIGS. 1, 4, 5, 6 and 7;

FIG. 12 is an exploded view of the component parts of the clamp assembly shown in FIG. 11;

FIG. 13 is a perspective view of an alternative form of clamp assembly;

FIG. 14 is an enlarged scale, fragmentary, sectional view taken in the vertical plane of the line 14—14 in FIG. 13;

FIG. 15 is a greatly enlarged top plan view showing an improved configuration of the adjusting cam engaging means employed in the embodiments shown in FIGS. 1 and 3;

FIG. 16 is a top plan view of the embodiment of the invention shown in FIG. 2;

FIG. 17 is a side elevational view, partly in section, of the embodiment shown in FIG. 2;

FIG. 18 is an exploded view of the component parts (except the clamp assembly) of the embodiment shown in FIG. 2;

FIG. 19 is an exploded view, partly in section of the connector assembly shown in FIG. 18 as molded in situ and the stripped cable end ready for insertion therein;

FIG. 20 is a longitudinal section of the embodiment shown in FIG. 2 and more particularly showing the configuration of the engagement of the contact member with the conductor cable after being inserted and attached thereto by a swaging action; and FIG. 21 is a transverse section taken on the line 21—21 of FIG. 17.

DETAILED DESCRIPTION OF THE PREFERRED EMBODIMENTS

Before proceeding with the detailed description of the various embodiments illustrated and for the convenience of terminology hereinafter to be employed, the component which affords electrical contact between the terminal and the conductor will be designated as the contact element, the member which surrounds the terminal gripping portion of the contact element will be designated as the body element, and the manually operable assembly which supplied the constricting, terminal gripping pressure will be called the clamp assembly.

Referring now to the first embodiment shown in FIGS. 1 and 4–7, inclusive, the device comprises a body member 1 formed of a resilient, nonconductive material, e.g., plastic, which is provided with a bore 2 extending therethrough in which the terminal receiving split sleeve portion 3 of the contact element 4 is received, the ends of said bore being slightly counterbored as at 5, 5 to receive the ribs 6, 6 on the ends of said sleeve portion. The sleeve has a tapered internal surface 7 which is complementary to the taper of a storage battery terminal post P and is split at diametrically opposite points 8, 8 to permit it to be constricted into tight encircling engagement with the terminal post. The contact element is formed of slightly resilient metal and when in a condition of repose, the internal diameter of the sleeve portion is such as to readily and loosely receive the battery terminal post for which it is intended.

The upper end of the contact element comprises a tubular socket portion 9 formed integrally with the sleeve portion and extending at right angles to the axis of the sleeve portion and preferably with the sleeve portion axis intersecting the axial line of the socket portion. The socket portion is united with the end of the sleeve portion by risers 10, 10 extending upwardly from diametrically opposite points on the upper end of the sleeve portion and adjacent to the slots 8, 8 so that the sleeve, in effect, is formed of a pair of substantially semicircular leaves 11, 11 each extending from the adjacent riser 10 to the diametrically opposite slot 8.

Having reference to FIG. 6, the socket portion at one end is provided with a straight bore portion 12 which leads into a converging taper bore portion 13 and the small diameter portion thereof meets with the small diameter end of a coaxially disposed taper bore portion 14 extending from the opposite end of the socket portion. The taper bore portion 14 receives the end of the insulation covering A of a conductor cable from the distal end of which the insulation has been stripped to an extent permitting the conductor ends B to extend almost to the juncture of the bores 12 and 13. A taper pin 15 is then inserted from the opposite end and is driven in tightly with resultant expanding of the conductor wires against the taper bore 13 and thus preventing the cable from being pulled out. This provides a good, electrically conductive, connection between the conductors of the cable and the contact element without need for a solder joint. Preferably, the material of at least the contact element or the taper pin is softer than the conductor wires so that driving in the pin tends to embed the wires in the softer material. To release the conductor from the contact element, all that is necessary is to press the cable into the socket member a few thousandths of an inch and the plug will be released sufficiently to be readily withdrawn, thus permitting the cable to be pulled out of the opposite end of the socket portion. Alternatively, the contact element may be formed of a lead or lead alloy casting, the use of which will inhibit corrosion.

The body member 1 includes a wall portion 16 which extends around the greater portion of the bore 2 in a portion of uniform cross section and terminates in spaced apart arm portions 17, 17 which project therefrom radially outwardly generally parallel to a radial line extending from the axial line of the bore 2 and with the adjacent faces of the arm portions laterally offset to provide overlapping ledge portions 18, 18. The outer side faces of the arm portions are provided with mirror image concave recesses 19, 19 for reception of either the adjusting cam 20 or the cam face 21 of the cam lever 22 of the clamp assembly 23 (see FIGS. 11 and 12) said cam lever and adjusting cam being detachably interconnected by side members 24, 24 by means presently to be described. Alternatively, the corresponding clamp assemblies shown in the said prior applications may be employed if desired.

Specifically, the adjusting cam 20 is formed as a plastic molding and includes integrally formed headed studs 20', 20' which are axially aligned with each other and are eccentrically disposed with respect to the axial line of the cylindrical cam body and the cam lever 22 is similarly provided with identical headed studs 21', 21'. The side member 24, 24 are plate like members of ring sectoral configuration in plan and at each end thereof they are provided with oppositely disposed "buttonhole" openings 24', 24'. Each of said openings comprises a larger portion 25 through which the head portions of the cam lever and the adjusting cam studs may be inserted and a smaller portion 26 adjacent the end of the member affording bearing support for the shanks of said stud portions and said portions 25 and 26 being so disposed relative to each other that the juncture thereof forms opposed points spaced apart a distance slightly less than the diameter of the stud shanks so that a cam lever and an adjusting cam may be assembled with a pair of said side members by snap-in assembly.

As in the said prior application, the periphery of the adjusting cam is provided with an equally spaced, odd number of grooves 27 extending from side to side thereof and which engage one or the other of the corner spurs 28, 28 disposed at the junctures of the ends of each concave recess 19 with the side surface of the arm portion 17. The mode of operation and use of this clamp assembly is identical with that shown in the said application Ser. No. 720,762.

Because of the capacity for constriction of the sleeve portion 3, the contact element 4 may be snapped into and out of assembly with the body member and when released, the body member and contact element may be relatively rotated to occupy positions in which the clamping assembly will be most accessible for operation and in which the associated cable cam must readily extend to the socket portion of the contact element. Assuming that a cable has been attached, the assembled contact element and body member are fitted over a battery terminal post P and the clamp assembly is closed causing the body member to constrict the sleeve into tight, electrically conductive engagement with the battery terminal. Alternatively, the connector may be applied to the battery terminal and the cable then inserted in the socket portion and secured by the taper pin.

Since the sleeve portion of the contact element is compressible, it has capacity for snap-in assembly and disassembly with the body member. As will presently appear, a given contact element may have snap-in engagement with different forms of body members and any one of a plurality of different body members may be assembled with selected ones of a plurality of different contact elements. It is also to be noted that in both embodiments above described, since the contact element extends to the exterior of the body member, a surface for attachment of a "jumper" terminal clamp is provided without need for special construction of the body member.

Referring next to FIGS. 3 and 8–10A, another embodiment of body member is shown assembled with a different contact element. As the description of these figures proceeds, it will be apparent that the body member may be interchangeably substituted for the body member 3 and that the contact element may be substituted for the contact element 4. In this embodiment, the body member 30 constitutes a plastic molding formed with a circular wall portion 31 defining a contact member sleeve receiving member bore 32 having counterbores 33, 33 at each end thereof for reception of the peripheral ribs 34, 34 on the sleeve portion 35 of the contact element generally indicated at 36. The body member includes integrally formed arms 37 and 38 extending in spaced parallel relation at opposite sides of a line extending radially of the axis of the bore 32. The distal end of the arm 37 carries a pin 39 disposed parallel to the axis of the bore 32 and the distal end of the arm 38 carries an identical pin 40. One end of an eccentric strap 41 is pivotally mounted on the pin 39 and secured thereon in any suitable manner as, for example, by riveting the end of the pin 39 into a countersunk clearance at the outer end of the bore 42 in the eccentric strap with which the pin 39 is engaged. The other end of the eccentric strap is provided with an eccentric receiving opening 43 closely fitting an eccentric 44 mounted for oscillation on the pivot pin 40 and secured thereon in any suitable manner as by similarly riveting the end of a pin 40 into a countersunk end of the bore 45 formed in the eccentric end through which the pin 40 extends. The eccentric and eccentric strap are also formed as plastic moldings and the eccentric is further provided with an integrally formed laterally extending handle 46 by which it may be operated. The relative rotative position of the eccentric and handle is such that when the handle is moved counterclockwise to the position shown in FIG. 10, the arms 37 and 38 will be drawn toward one another with resultant constriction of a terminal engaging sleeve mounted in the bore 32. This embodiment of operating means differs from that previously described in that swinging the handle in a clockwise direction as viewed in FIG. 10, operates to spread the arms 37 and 38 apart with resultant positive disengagement from the battery terminal post.

The conductor engaging socket portion of the contact element 36, comprises a tubular, conductor receiving sleeve 47 formed integrally with the sleeve portion 35 and disposed in substantial axial alignment therewith. A pair of inverted L-shaped slots 48, 48 which correspond to the slots 8, 8 of the contact member 4 divide the sleeve portion 35 into a pair of leaf elements 49, 49 to facilitate the constriction and release of the sleeve portion in engaging and disengaging a terminal post. Beyond these slots, the conductor receiving sleeve 47 is internally threaded for a short distance as at 50 and thence continues in a first converging taper bore 51 which meets the small end of a similarly converging taper bore 52 extending from the distal end of the sleeve portion 47. A taper pin 53 generally similar to the taper pin 15 except for being threaded to engage the thread 50, operates to anchor the conductor wires B of a conductor cable A in the taper bore 51.

Because of the capacity for constriction of the sleeve portions 3 and 35, the contact element 4 or 36 may be snapped into and out of assembly with either of those body members. When released, the body members may be relatively rotated to occupy a position in which the clamping assembly associated therewith is most readily accessible for operation. Any sequence of steps in attaching the connector to a cable and to a terminal post may be employed. The cable may be attached to the contact element either before or after the contact element is snapped into the body member and this connection, it will be obvious that either the driven type of taper pin 15 or the threaded type 53 may be employed with either contact member with complementary modification of the contact member. While a cable can be attached to the contact element 4 after that element has been clamped to a terminal post, the fact remains that the cable extends parallel to the top of the battery. The connector element 36 requires that the cable be attached thereto before the body member and contact element are clamped to the battery terminal post, but the cable approaches the battery terminal with the least possible use of lateral space adjacent to the top of the battery. A point involved is that as thus far disclosed, the invention involves two forms of contact elements and two forms of body members which are completely interchangeable to suit the requirements of different proposed uses.

FIGS. 13 and 14 show an alternative form of clamping assembly generally indicated at 60 which is also formed of a series of plastic moldings. In this embodiment, the adjusting cam component 61, and the operating handle 62 are carried on pivot pins 63 and 64 which are formed integrally with and rise from one side of a base member 65 which serves also as a connecting member. At the opposite ends of the bores through the adjusting cam and the operating cam lever, the pivot pin portions 63 and 64 are reduced in diameter as at 63′ and 64′ and these reduced diameter portions extend through complementary openings 66, 66 in a side plate 67 constituting the second connecting member and the ends of said reduced diameter portions project beyond the outer face of the plate 67 and are riveted by heat and pressure into countersunk portions 68 and 69 as best shown in FIG. 14. This clamp assembly can, of course, be used interchangeably with the clamp assembly 23 either on the first embodiment of the invention or on the third embodiment shown in FIG. 2 and certain other figures presently to be described. Additionally, of course, these assemblies may be employed in place of the cam assembly shown in the said co-pending application.

Referring next to FIGS. 2 and 16–21, inclusive, the embodiment of the invention there disclosed contemplates a construction in which the contact element is molded in situ in the body member, but which possesses some of the features of the other embodiments. In this embodiment, the contact element 70 comprises a hollow metal terminal receiving sleeve 71 having a hollow tubular shank portion 72, projecting radially from the axial line of the sleeve portion. This contact member is cast or molded in a body member 73, formed from a resilient plastic material capable of cold flow and which includes a shank portion 74 which surrounds the tubular shank portion 72, and an opening 75 extending therethrough in which the sleeve portion 71 is housed. The interior of the sleeve portion 71 is tapered to complement the taper of a battery terminal post and beyond the small end of said taper the exterior diameter is reduced as at 76 forming a shoulder 77 which rests against the complementary shoulder 78 on the body member 73, the said reduced diameter portion 76 of the contact element sleeve portion 71 extends beyond the outer surface of the body member to provide a conductive surface engageable by a "jumper" terminal clamp. The body member shank 74 extends beyond the end of the contact element shank and is larger in diameter to provide a socket 79 to receive the end of the insulating cover of the cable to be connected to the contact element.

To attach this connector assembly to a cable, the cable A with the end of the insulating cover stripped to bare the conductor wires B is pressed into the socket 79 with the bundle of wires entering the sleeve 72. While holding the cable thus assembled in the sleeve member the assembled parts are placed in a press and the plastic shank portion of the body member and the ductile sleeve 72 are flattened to an oval shape tightly gripping the wires B as best shown in FIG. 21.

While the device is shown as being operated by the clamping device assembly 60, it will be obvious that the previously described clamping device 23 or the clamping device of the said prior application may be used if desired.

Thus there has been provided a quickly attached and detached connector for battery terminal posts and other similar uses which is composed of a plurality of subassemblies which may be interchangeably or optionally employed. Moreover, since the contact element is not required to absorb the stress of serving as the contact pressure means, it can be conveniently formed of a lead or lead alloy which being at least substantially identical to the material of the battery terminal, will avoid corrosion. Other than this contact element, all of the other parts may be formed of nonconductive materials and therefore made to be noncorroding.

We claim:

1. In a connector adapted for connection to the end of an electrical conductor and manually operated to effect or interrupt electrically conductive connections between the conductor and a post type terminal means, a resilient, nonconductive body member having an opening capable of constriction extending therethrough, an electrically conductive contact element carried by said body member and including a hollow cylindrical portion engaging and lining said opening and being capable of being constricted by constriction of said body member opening into tight electrically conductive contact with an electrical terminal disposed in said cylindrical portion incident to constriction of said opening in said body member, said contact element being freely rotatable in said opening when said body member is not constricted and further having a socket portion in which the end of the electrical conductor is received and secured, and devices formed wholly of nonconductive material mounted in said body member and manually operable to distort said body member in a manner effecting simultaneous constriction of said opening and said portion of said contact element lining said opening with resultant electrically conductive connections between an electrical terminal embraced by said portion of said contact element and a conductor electrically conductively connected in said socket portion of said contact element.

2. An electrical connector as claimed in claim 1 in which said body member engaging portion of said contact element is resilient and has a detachable snap-in engagement in said opening in said body member.

3. An electrical connector as claimed in claim 1 in which said conductor socket portion in said contact element is disposed at right angles to the axial line of said body member opening engaging portion.

4. An electrical connector as claimed in claim 1 in which the axial line of said conductor receiving socket portion of said contact element is disposed in substantial parallelism with the axial line of said body member opening engaging portion.

5. An electrical connector as claimed in claim 1 in which said socket portion of said contact element comprises an integrally formed sleeve having converging taper bores extending from the opposite ends thereof and a taper pin insertable in one of said ends operative to anchor the connector wires of a conductor end projecting from the other end of said sleeve into the tapered bore occupied by said pin.

6. An electrical connector as claimed in claim 1 in which said body member includes a slot extending from said opening to an outer surface of said body member and defined by a pair of parallel arm portions engaged by said manually operative devices.

7. An electrical connector as claimed in claim 6 in which said slot is formed with overhanging ledge portions.

8. An electrical connector as claimed in claim 6 in which said manually operable devices includes a cam mounted on one of said arm portions, a strap, engaging said cam and pivotally mounted on the other of said arm portions and a hand lever carried by said cam for effecting rotative movement thereof, whereby movement of said lever in one direction causes said arms to constrict and movement of said lever in the opposite direction forces said arms to open.

References Cited
UNITED STATES PATENTS

| | | | |
|---|---|---|---|
| 1,834,475 | 12/1931 | Sottiaux | 339—100 |
| 1,873,775 | 8/1932 | McMaster et al. | 339—229 |
| 2,119,294 | 5/1938 | Schaefer | 339—116 |
| 2,310,708 | 2/1943 | Ransom et al. | 339—239 |
| 2,497,238 | 2/1950 | Rutherford | 339—232 |
| 2,818,552 | 12/1957 | Zam | 339—116 |
| 3,152,854 | 10/1964 | Osborn | 339—237 |
| 3,356,988 | 12/1967 | Gall | 339—230 |

RICHARD E. MOORE, Primary Examiner

J. H. McGLYNN, Assistant Examiner